United States Patent
Moriya et al.

(10) Patent No.: US 11,868,718 B2
(45) Date of Patent: Jan. 9, 2024

(54) TECHNOLOGY NAME/SERVICE NAME GENERATION DEVICE AND METHOD THEREFOR

(71) Applicant: Nippon Telegraph and Telephone Corporation, Tokyo (JP)

(72) Inventors: Takaaki Moriya, Tokyo (JP); Hiroyuki Fujii, Tokyo (JP); Manabu Nishio, Tokyo (JP); Naoki Tateishi, Tokyo (JP); Atsushi Yoshida, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 348 days.

(21) Appl. No.: 17/284,923

(22) PCT Filed: Oct. 4, 2019

(86) PCT No.: PCT/JP2019/039379
§ 371 (c)(1),
(2) Date: Apr. 13, 2021

(87) PCT Pub. No.: WO2020/080155
PCT Pub. Date: Apr. 23, 2020

(65) Prior Publication Data
US 2021/0383063 A1     Dec. 9, 2021

(30) Foreign Application Priority Data

Oct. 18, 2018    (JP) ................................. 2018-196392

(51) Int. Cl.
*G06F 40/242* (2020.01)
*G06F 16/33* (2019.01)
(Continued)

(52) U.S. Cl.
CPC .......... *G06F 40/242* (2020.01); *G06F 16/335* (2019.01); *G06F 16/3344* (2019.01);
(Continued)

(58) Field of Classification Search
CPC .. G06F 40/242; G06F 16/3344; G06F 16/335; G06F 16/353; G06F 40/247;
(Continued)

(56) References Cited

U.S. PATENT DOCUMENTS 8,355,926 B1 *  1/2013  Hinz ...................... G06Q 10/10
                                                                        705/2
9,456,086 B1 *  9/2016  Wu ...................... H04M 3/5233
(Continued)

FOREIGN PATENT DOCUMENTS

JP       2014-215633      11/2014

*Primary Examiner* — Edwin S Leland, III
(74) *Attorney, Agent, or Firm* — Fish & Richardson P.C.

(57) ABSTRACT

Information indicating what technology and service are necessary to solve issues is provided by a device including dictionaries recording words having similar meanings and concepts concept co-occurrences in which two of the concepts are combined, a classification of each of technology names and service names, and a score assigned to each of the classifications, a sentence input unit receiving a sentence representing an issue, a morpheme analysis unit performing morpheme analysis on the sentence and output morphemes, a concept conversion unit extracting a word from the morphemes and convert the extracted word to a concept, a classification identifying unit configured to sum scores of respective classifications in which a set of the extracted concepts and the concept co-occurrence match and identify the classification having a highest summed score, and a recommendation unit configured to obtain, from the name list, the technology names and service names belonging to the identified classification.

4 Claims, 13 Drawing Sheets

(51) Int. Cl.
*G06F 16/335* (2019.01)
*G06F 16/35* (2019.01)
*G06F 40/247* (2020.01)
*G06F 40/253* (2020.01)
*G06F 40/268* (2020.01)
*G06F 40/284* (2020.01)
*G06F 40/30* (2020.01)

(52) U.S. Cl.
CPC .......... *G06F 16/353* (2019.01); *G06F 40/247* (2020.01); *G06F 40/253* (2020.01); *G06F 40/268* (2020.01); *G06F 40/284* (2020.01); *G06F 40/30* (2020.01)

(58) Field of Classification Search
CPC .... G06F 40/253; G06F 40/268; G06F 40/284; G06F 40/30
USPC .............................................................. 704/9
See application file for complete search history.

(56) References Cited

U.S. PATENT DOCUMENTS

| | | | | |
|---|---|---|---|---|
| 9,461,876 | B2* | 10/2016 | Van Dusen | G06N 20/00 |
| 9,860,391 | B1* | 1/2018 | Wu | H04M 15/8061 |
| 11,080,336 | B2* | 8/2021 | Van Dusen | G06Q 50/01 |
| 11,080,490 | B2* | 8/2021 | Koohmarey | G06N 3/006 |
| 2002/0091991 | A1* | 7/2002 | Castro | G06F 9/06 |
| | | | | 717/106 |
| 2014/0075004 | A1* | 3/2014 | Van Dusen | G06N 20/00 |
| | | | | 709/223 |
| 2014/0365386 | A1* | 12/2014 | Carstens | G06Q 10/10 |
| | | | | 705/310 |
| 2017/0235848 | A1* | 8/2017 | Van Dusen | G06F 16/904 |
| | | | | 705/12 |
| 2018/0060426 | A1* | 3/2018 | Gluck | G06F 16/353 |
| 2021/0383063 | A1* | 12/2021 | Moriya | G06F 40/30 |

* cited by examiner (a)
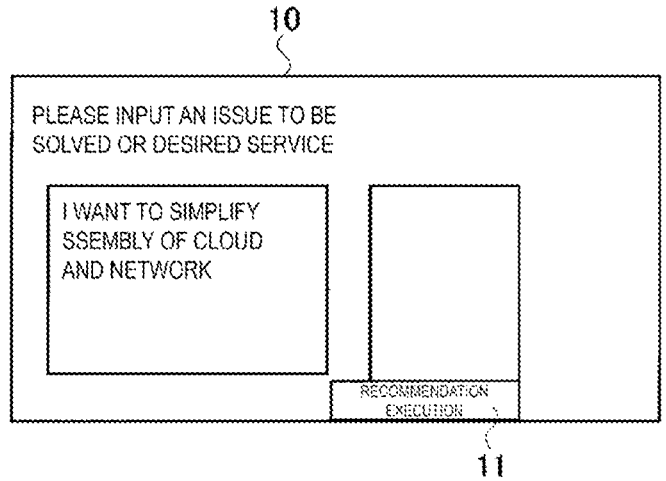
(b)
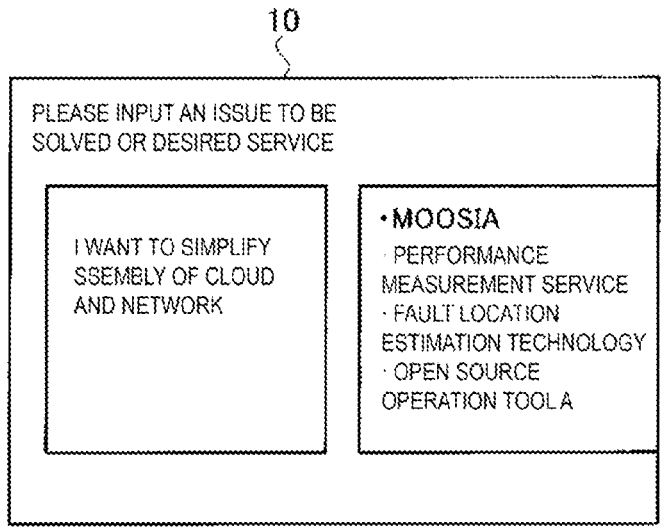
Fig. 3

| CLASSIFICATION | LIST OF TECHNOLOGY NAMES AND ELEMENT SERVICE NAMES BELONGING TO CLASSIFICATION |
|---|---|
| CLASSIFICATION (1): OPERATION SUPPORT | •MOOSIA<br>• PERFORMANCE MEASUREMENT SERVICE<br>• FAULT LOCATION ESTIMATION TECHNOLOGY<br>• OPEN SOURCE OPERATION TOOL A |
| CLASSIFICATION (2): IP-NW | •MSF<br>•Lagopus |
| ... | |
| CLASSIFICATION n: IMAGE PROCESSING | •Kirari!<br>• HEVC ENCODER |

Fig. 9

TECHNOLOGY NAME/SERVICE NAME GENERATION DEVICE AND METHOD THEREFOR

CROSS-REFERENCE TO RELATED APPLICATIONS

This application is a National Stage application under 35 U.S.C. § 371 of International Application No. PCT/JP2019/039379, having an International Filing Date of Oct. 4, 2019, which claims priority to Japanese Application Serial No. 2018-196392, filed on Oct. 18, 2018. The disclosure of the prior application is considered part of the disclosure of this application, and is incorporated in its entirety into this application.

TECHNICAL FIELD

The present invention relates to a technology name and service name generation device that generates a technology name or a service name necessary for solving an issue, and a method thereof.

BACKGROUND ART

There are various types of business issues that are being faced-on-site. Meanwhile, various technologies and services have been developed for the purpose of solving issues. However, in some cases the needs and solutions may not match each other, and painstakingly developed technologies and services may not be an option.

That is because although a user expects that there will be technologies and services that will solve an issue, because the kind of technologies and services that exist cannot be ascertained, the user cannot use these painstakingly developed technologies and services. Further, there is an issue that it is difficult for a developer to ascertain individual needs, and thus it is not possible to painstakingly develop technologies and services.

In the related art, for example, a technology disclosed in Patent Literature 1 is known as a technology for providing appropriate information in response to an ambiguous request from a user. The technology disclosed in Patent Literature 1 assists the user in discovering a desired service from among a large number of Web services.

This method is a method of classifying services in consideration of characteristics regarding an intent representing an intention of a service provider using a natural language representation, and assisting the user in discovering a service.

CITATION LIST

Non-Patent Literature

Patent Literature 1: JP 2014-215633 A

SUMMARY OF THE INVENTION

Technical Problem

However, the technology disclosed in Patent Literature 1 is specialized for web services, and cannot appropriately support a wide range of requests from users. That is, there is a problem that a device and a method for providing a user with information indicating what technology and service are necessary to solve an issue do not exist yet.

The present invention has been made in view of this problem, and an object of the present invention is to provide a technology name and service name generation device that provides a user with information indicating what technology and service are necessary to solve the issue, and a method therefor.

Means for Solving the Problem

A technology name and service name generation device according to an aspect of the present invention is a technology name and service name generation device for generating a technology name and a service name necessary for solving issues, the technology name and service name generation device including: a synonym dictionary recording words having similar meanings and concepts each representing one or more of the words in association with each other; a classification dictionary recording concept co-occurrence in which two of the concepts are combined, a classification of each of technology names and service names, and a score assigned to each of the classifications in association with each other; a name list recording technology names and the service names belonging to each of the classifications; a sentence input unit to which a sentence representing the issue to be solved is input; a morpheme analysis unit configured to perform morpheme analysis on the sentence and output morphemes; a concept conversion unit configured to extract a noun and a verb from the morphemes and convert the extracted word to a concept by referring to the synonym dictionary; a classification identifying unit configured to sum scores of the respective classifications in which a set of the concepts extracted from the one sentence and the concept co-occurrence match by referring to the classification dictionary, and identify a classification having a highest summed score; and a recommendation unit configured to obtain, from the name list, the technology names and service names belonging to the classification identified by the classification identifying unit.

A technology name and service name generation method according to an aspect of the present invention is a technique name and service name generation method executed by the technology name and service name generation device, the method including: inputting a sentence representing the issue to be solved; performing morpheme analysis on the sentence and outputting morphemes; extracting a noun and a verb from the morphemes and converting the extracted word to a concept by referring to the synonym dictionary; summing scores of the respective classifications in which a set of the concepts extracted from the one sentence and the concept co-occurrence match by referring to the classification dictionary, and identifying a classification having a highest summed score; and obtaining, from the name list, the technology names and service names belonging to the classification identified in the identifying.

Effects of the Invention

According to the present invention, it is possible to provide a user with information indicating what technology and service are necessary to solve issues.

BRIEF DESCRIPTION OF DRAWINGS

FIG. 3 is a diagram schematically illustrating an example of an issue to be solved displayed in a sentence input unit of the technology name and service name generation device illustrated in FIG. 1, and displayed technology names and service names.

FIG. 6 is a diagram schematically illustrating a copied concept co-occurrence.

FIG. 9 is a diagram schematically illustrating an example of a configuration of information recorded in a name list of the technology name and service name generation device illustrated in FIG. 1.

DESCRIPTION OF EMBODIMENTS

Hereinafter, embodiments of the present invention will be described below with reference to the drawings. The same parts in a plurality of drawings are denoted by the same reference signs and description thereof will not be repeated.

First Embodiment

Figure 1:
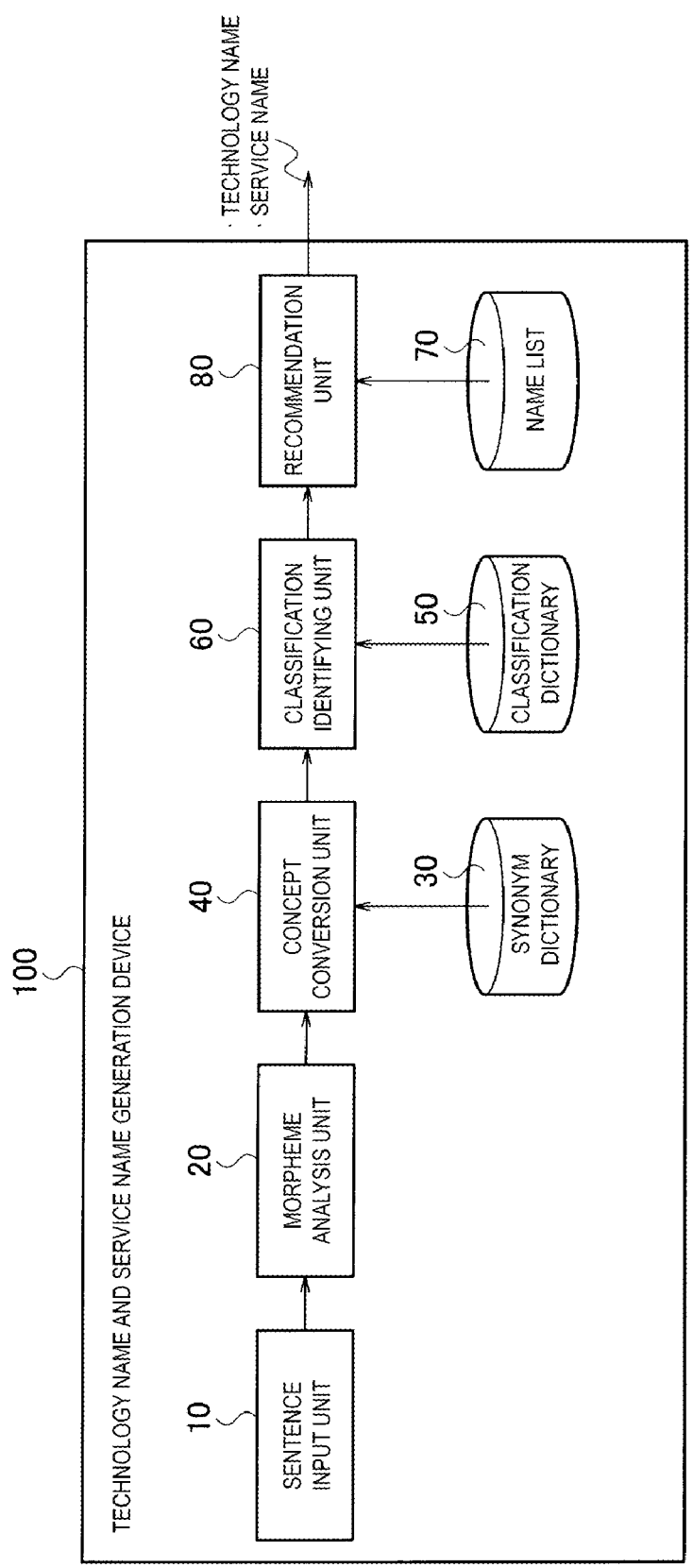
FIG. 1 is a block diagram illustrating an example of a functional configuration of a technology name and service name generation device according to a first embodiment of the present invention.

FIG. 1 is a block diagram illustrating an example of a functional configuration of a technology name and service name generation device according to a first embodiment of the present invention. The technology name and service name generation device 100 illustrated in FIG. 1 provides a technology name and a service name that can be used to solve an issue input by a user.

The technology name and service name generation device 100 includes a sentence input unit 10, a morpheme analysis unit 20, a synonym dictionary 30, a concept conversion unit 40, a classification dictionary 50, a classification identifying unit 60, a name list 70, and a recommendation unit 80. Each of functional components of the technology name and service name generation device 100 is realized by, for example, a computer including a ROM, a RAM, a CPU, and the like. When each functional component is realized by the computer, processing content of a function that each functional component should have is described by a program.

The technology name and service name generation device 100 may be configured using a client server system. In this case, for example, the sentence input unit 10 is a client configured using one personal computer (hereinafter, PC), and the other functional component is a server. The client and the server may be connected via a network, and a plurality of clients may be connected to the server via the network.

Figure 2:
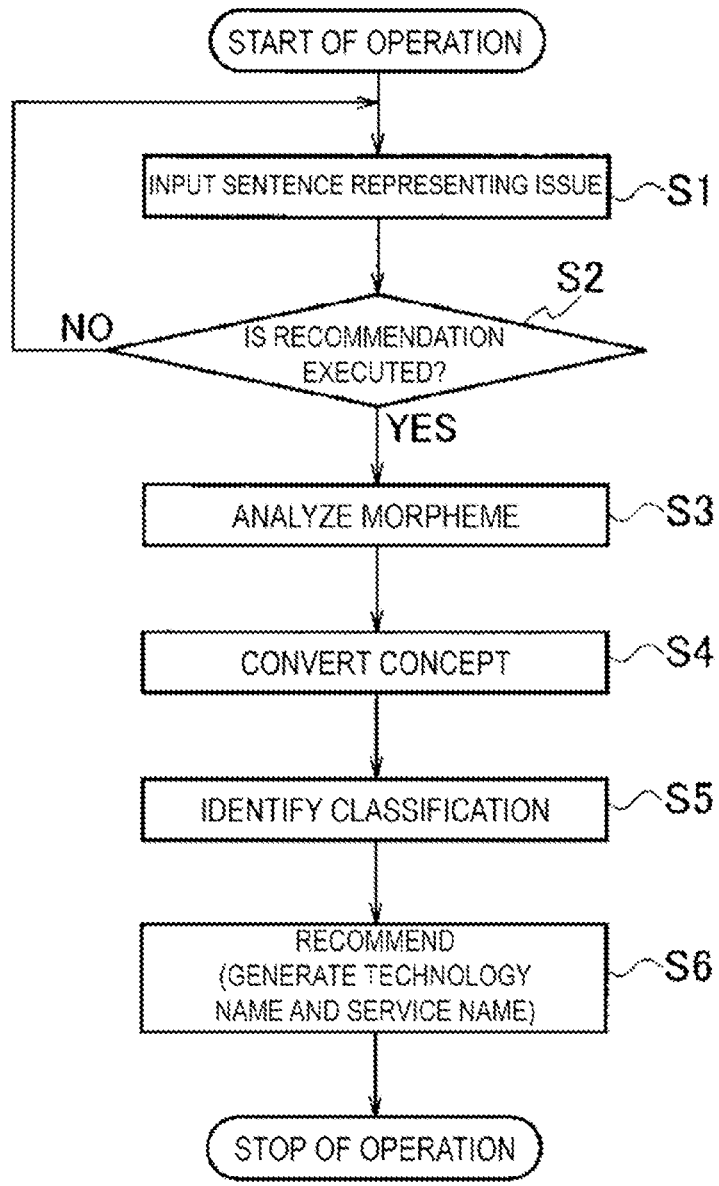
FIG. 2 is a flowchart illustrating a processing procedure of the technology name and service name generation device illustrated in FIG. 1.

FIG. 2 is a flowchart illustrating a processing procedure of the issue solving support device 100. Hereinafter, an operation of the technology name and service name generation device 100 will be described with reference to FIGS. 1 and 2 and other drawings.

A sentence representing an issue that the user wants to solve is input to the sentence input unit 10 (step S1). The user inputs the issue to be solved.

The sentence input unit 10 is configured of, for example, one PC, and the user inputs a sentence using a keyboard (not illustrated). The sentence may be input by speech spoken by the user. Conversion of speech to text can be easily realized by using a well-known voice recognition engine (a processing device). A part of the sentence input unit 10 is configured of a display panel (not illustrated) of the PC, and a technology name and a service name provided by the technology name and service name generation device 100 are also displayed on the display panel.

FIG. 3 is a diagram schematically illustrating an example of an issue to be solved and a technology name and a service name used to solve the issue, which are displayed on the display panel of the PC. FIG. 3(a) illustrates a state in which, for example, a sentence representing an issue to be solved such as "I want to simplify assembly of cloud and network", which is a sentence representing an issue to be solved input by the user, is input (step S1). In this state, the technology name and the service name are not displayed.

After inputting the above sentence, the user presses a recommendation execution button 11 displayed on the display panel, for example (YES in step S2). Then, the morpheme analysis unit 20 performs morpheme analysis on the input sentence and outputs morphemes of the sentence (step S3).

The morpheme analysis is to decompose a sentence into smallest meaningful units (words) and determine a part of speech or the like. The morpheme analysis unit 20 can be configured using a well-known morpheme analysis engine (a processing device).

The synonym dictionary 30 stores words that have similar meanings and one or more concepts representing the words in association with each other. The synonym dictionary 30 can be created by a person in advance. Hereinafter, the words having similar meanings may be referred to as synonyms.

The concept conversion unit 40 performs morpheme analysis on the sentence and extracts a noun and a verb. Nouns "cloud" and "network", and a verb "assemble" are extracted from the sentence representing the issue to be solved.

Then, the concept conversion unit 40 extracts a noun and a verb from the morphemes output by the morpheme analysis unit 20, and converts the extracted words into the above concept referring to the synonym dictionary 30 (step S4). Here, the concept is a word representing one or more synonyms. For a word having no synonyms, the word is a concept.

Figure 4:
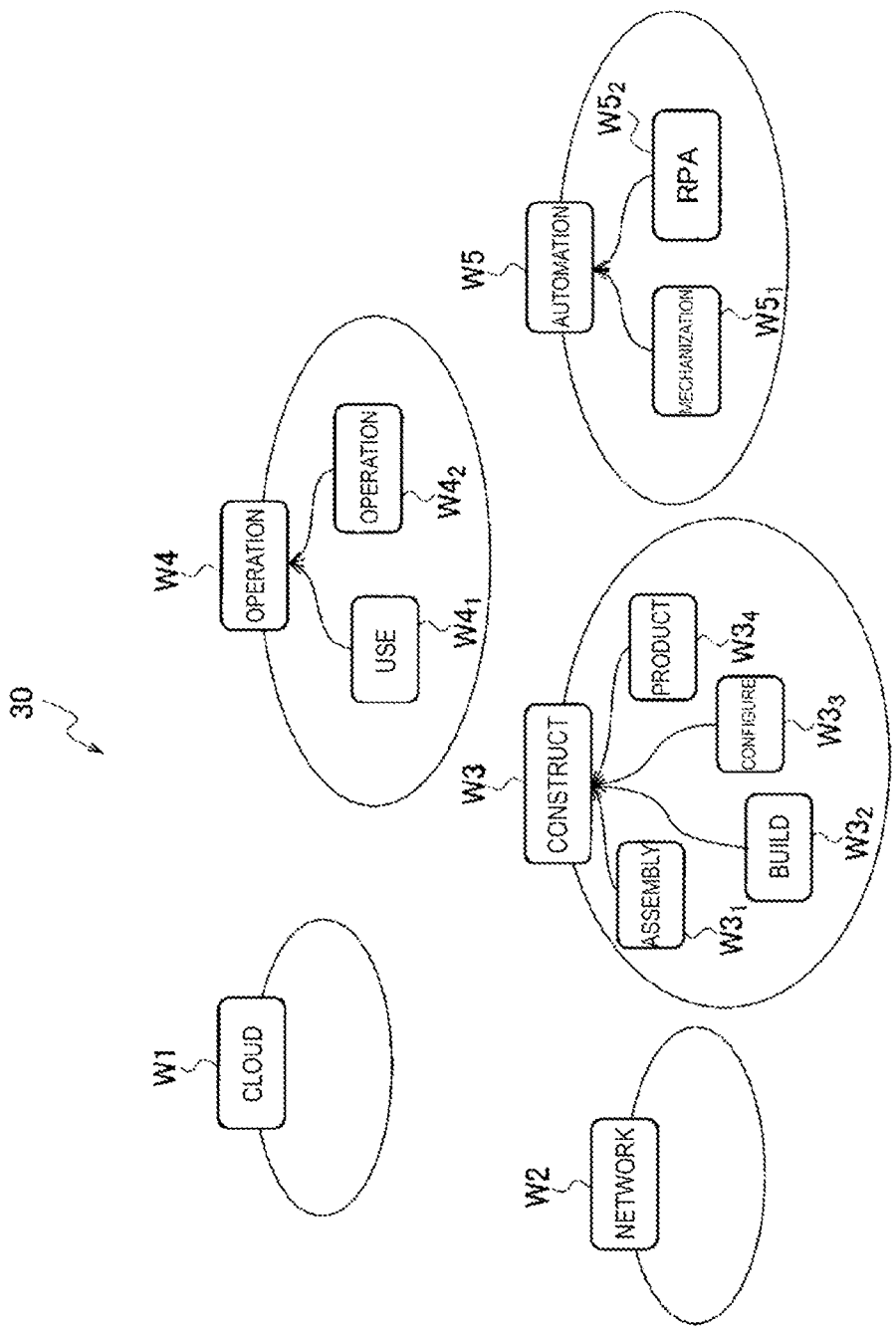
FIG. 4 is a diagram schematically illustrating a relationship between synonyms and concepts recorded in a synonym dictionary of the technology name and service name generation device illustrated in FIG. 1.

FIG. 4 is a diagram schematically illustrating a relationship between the synonyms and the concepts recorded in the synonym dictionary 30. A concept representing a synonym of "assemble $W3_1$", "build $W3_2$", "configure $W3_3$", and "produce $W3_4$" is "construct $W_3$", as illustrated in FIG. 4.

Further, "network" will be described assuming that there is no synonym, for example. In this case, the network is a concept W2. The same applies to "cloud W1". Description of W3 and subsequent concepts is omitted. Thus, the synonym dictionary 30 records a large number of records including synonyms having similar meanings and concepts representing the synonyms.

For example, when it is assumed that the nouns "cloud" and "network", and the verb "assemble" are extracted from the sentence representing the issue as described above, the concept conversion unit 40 converts the respective words to obtain three concepts including "cloud", "network", and "construct". Thus, "assemble" is converted to a concept of "construct".

The classification dictionary 50 records A concept co-occurrence in which two concepts are combined, a classification of each of a technology name and a service name, and a score assigned to each classification in association with each other.

The classification identifying unit 60 sums the scores of the respective classifications in which the set of concepts extracted from the above sentence and the concept co-occurrence match by referring to the classification dictionary 50, and identifies a classification having a highest summed score (step S5). Here, when the classification identifying unit 60 refers to the classification dictionary 50, the classification identifying unit 60 generates a concept co-occurrence in which the two concepts are combined.

When there are u converted concepts, the number n of concept co-occurrences is expressed by the following equation.

[Math. 1]

$$n = \frac{u \times (u-1)}{2} \quad (1)$$

Figure 5:
FIG. 5 is a diagram schematically illustrating a relationship between concepts and concept co-occurrence.

FIG. 5 illustrates n generated concept co-occurrence P(n). As illustrated in FIG. 5, the concept co-occurrence P is $P(1)=\{W1, W2\}, \ldots, P(n)=\{W_{u-1}, W_u\}$. When the above three words are extracted from the input sentence, concept co-occurrences P(1)={cloud, network}, P(2)={network, construct}, and P(3)={cloud, construct} are generated.

Then, the classification identifying unit 60 extracts the concept co-occurrence Q(m) recorded in the classification dictionary 50 from the generated concept co-occurrence P(n). That is, when the concept co-occurrence P(i) generated from the input sentence is stored in the classification dictionary 50, the classification identifying unit 60 copies the stored concept co-occurrence P(i) to a concept co-occurrence Q(j). In the present embodiment, assuming that P(1), P(2), and P(3) are present in the classification dictionary 50, Q(1)="cloud, network", Q(2)="network, construct", and Q(3)="cloud, construct".

Figure 6:
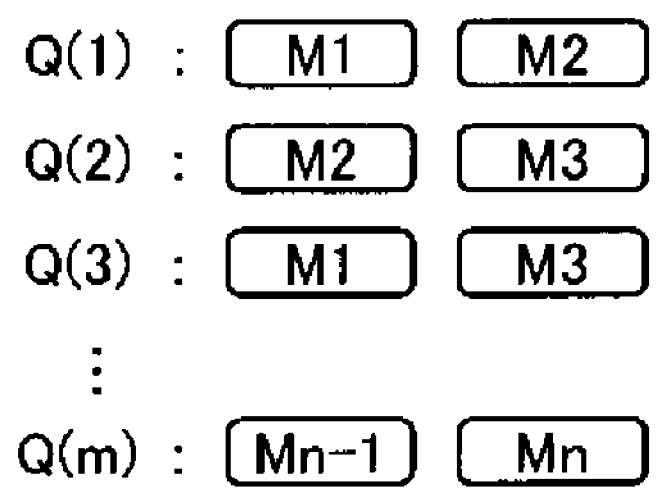

FIG. 6 is a diagram illustrating the concept co-occurrence Q(j) obtained by copying the concept co-occurrence P(i) stored in the classification dictionary 50. For example, the concept co-occurrence P(1)={cloud, network} generated from the input sentence is copied to the concept co-occurrence Q(1)={cloud, network}. In FIG. 6, the concepts stored in the classification dictionary 50 are notated by M1 to Mn.

Figure 7:
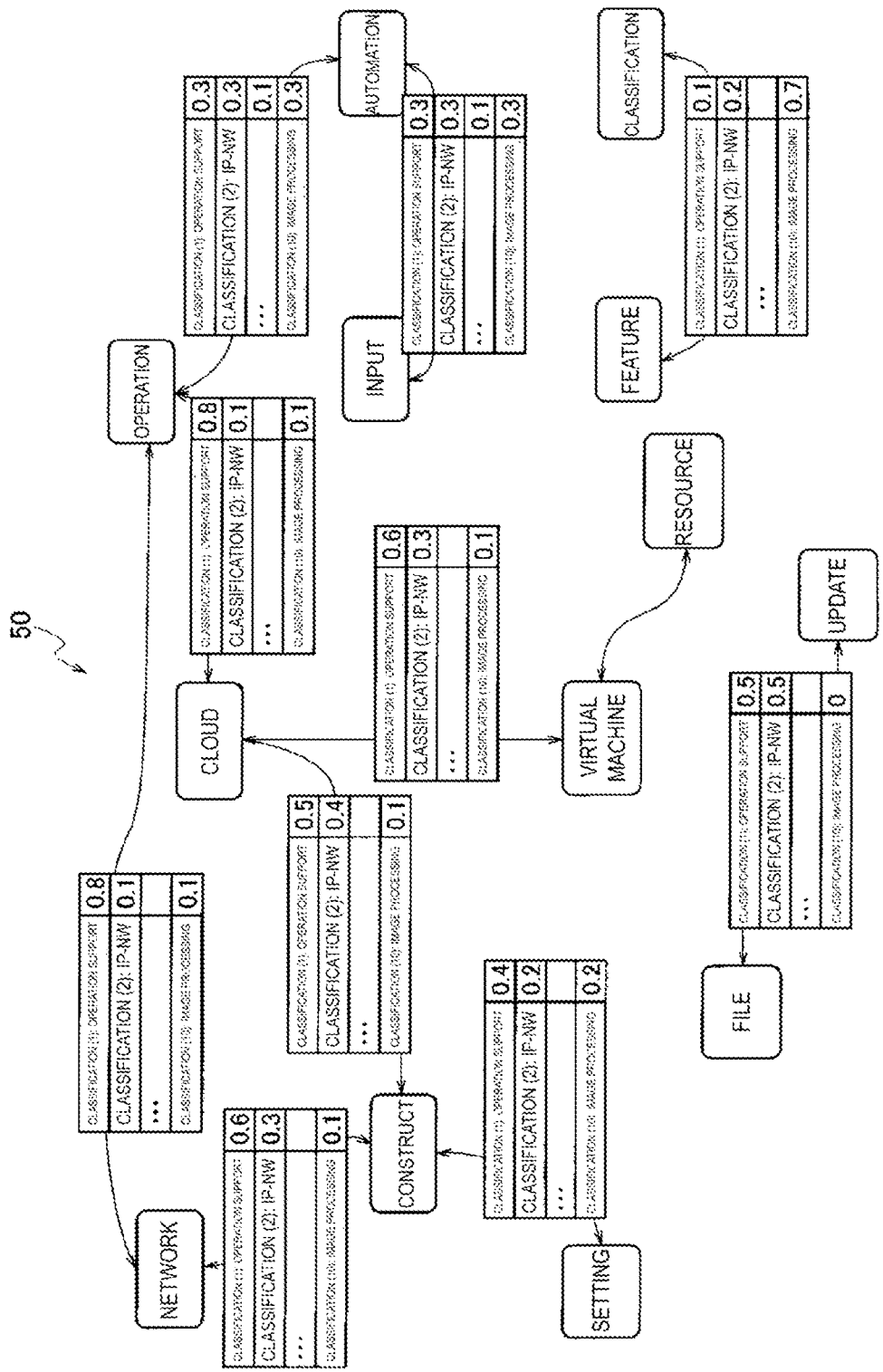
FIG. 7 is a diagram schematically illustrating an example of a configuration of information recorded in a classification dictionary of the technology name and service name generation device illustrated in FIG. 1.

FIG. 7 is a diagram schematically illustrating an example of a configuration of information recorded in the classification dictionary 50. The classification dictionary 50 records a concept co-occurrence Q(j) in which two concepts are combined, respective classifications of the technology names and the service names, and a score assigned to each classification in association with each other, as illustrated in FIG. 7.

A line connecting the two concepts represents the concept co-occurrence Q(j). For example, in the concept co-occurrence Q(2) of "network" and "construct", score 0.6 is associated with classification (1): operation support, score 0.3 is associated with classification (2): IP-NW, and score 0.1 is associated with classification (10): video process. A sum of the scores of the respective classifications is 1.0, for example. The score of classification (3) of which the notation is omitted is 0.0. In the present embodiment, an example in which the sum is 1.0 will be described, but the sum may be a determined constant. For example, the sum may be a constant such as 10 or 100.

The classification identifying unit 60 sums the scores of the respective classifications and identifies a classification having a highest summed score. In FIG. 7, a notation of the concept co-occurrence Q(1) of "network" and "cloud" is omitted because the notation in the drawing is complicated. A score of each classification of the omitted concept co-occurrence Q(1) is revised to be the same as that of the concept co-occurrence Q(2).

Figure 8:
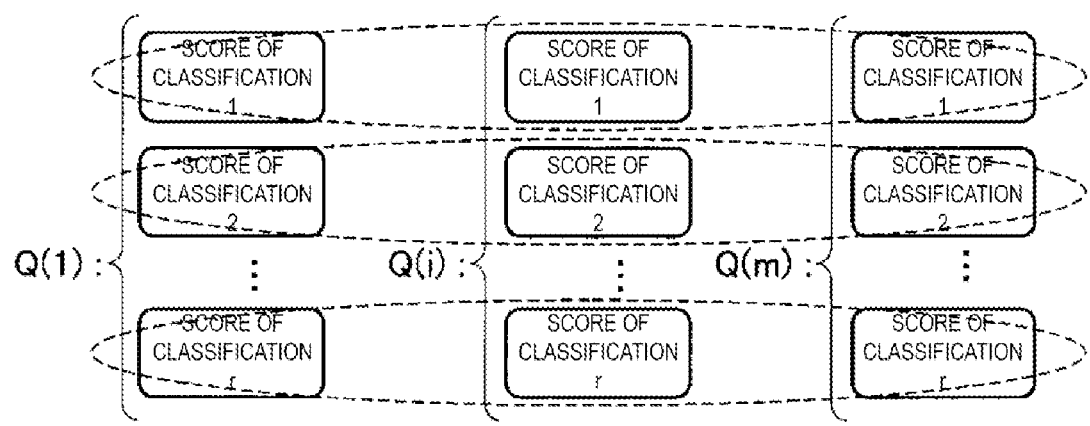
FIG. 8 is a diagram schematically illustrating that scores of respective classifications are summed.

FIG. 8 is a diagram schematically illustrating that scores of the respective classifications are summed. As a specific example, a sum of scores of classification (1) of Q(1) to Q(3) is 0.6+0.6+0.5=1.7, a sum of scores of classification (2) of Q(1) to Q(3) is 0.3+0.3+0.4=1.0, and a sum of scores of classification (10) of Q(1) to Q(3) is 0.1+0.1+0.1=0.3. Thus, the classification having the highest summed score is identified as "classification (1): operation support" in this example.

The name list 70 records the technology names and the service names belonging to each classification. FIG. 9 is a diagram illustrating an example of technology names and service names belonging to the classification recorded in the name list 70. MOOSIA, a performance measurement service, a failure location estimation technology, and an open source operation tool A are recorded in association with classification (1): operation support, as illustrated in FIG. 7.

The recommendation unit 80 obtains, from the name list 70, the technology name and service name that belong to the classification identified by the classification identifying unit 60 (step S6). The obtained technology name and service name are displayed, for example, on the display panel (FIG. 3(b)).

As described above, the technology name and service name generation device 100 according to the present embodiment is a technology name and service name generation device that generates a technology name or a service name necessary for solving an issue. The technology name and service name generation device 100 includes the synonym dictionary 30 recording words having similar meanings and concepts each representing one or more of the words in association with each other. Further, the technology name and service name generation device 100 includes the classification dictionary 50 recording the concept co-occurrence in which two concepts are combined, the respective classifications of the technology names and the service names, and the score assigned to each classification in association with each other. Further, the technology name and service name generation device 100 includes the name list 70 recording the technology names and the service names belonging to the classification. Further, the technology name and service name generation device 100 includes the sentence input unit 10 to which the sentence representing an issue to be solved is input, and the morpheme analysis unit 20 that performs morpheme analysis on the sentence and outputs the morpheme. Further, the technology name and service name generation device 100 includes the concept conversion unit 40 that extracts a noun and a verb from a morpheme and converts the extracted words into a concept by referring to the synonym dictionary 30. Further, the technology name and service name generation device 100 includes the classification identifying unit 60 that sums the scores of the respective classifications in which a set of the concepts extracted from the one sentence and the concept co-occurrence match by referring to the classification dictionary 50, and identify a classification having a highest summed score. Further, the technology name and service name generation device 100 includes the recommendation unit 80 that obtains, from the name list 70, the technology names and service names belonging to the classification identified by the classification identifying unit 60.

This makes it possible to provide a user with information indicating what technology and service are necessary to solve issues.

Second Embodiment

Figure 10:
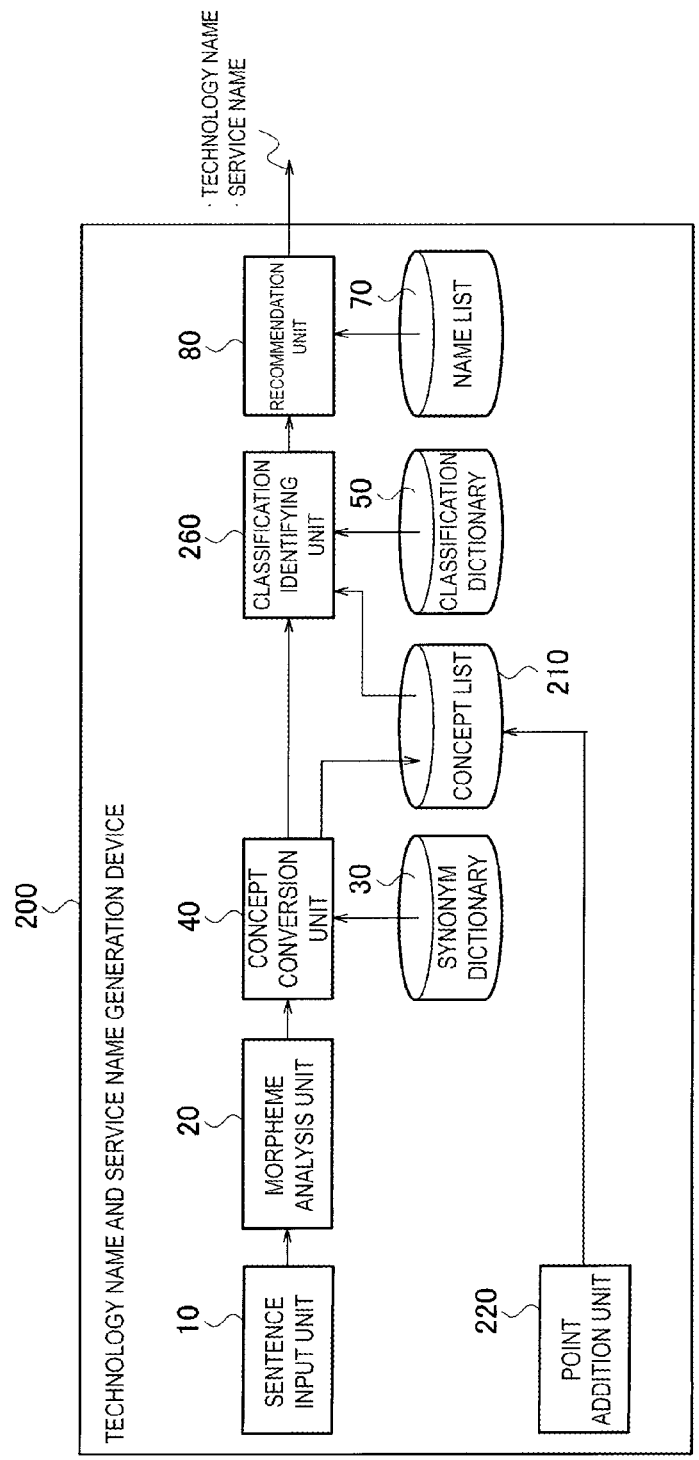
FIG. 10 is a block diagram illustrating an example of a functional configuration of a technology name and service name generation device according to a second embodiment of the present invention.

FIG. 10 is a block diagram illustrating an example of a functional configuration of a technology name and service name generation device according to a second embodiment of the present invention. The technology name and service name generation device 200 illustrated in FIG. 10 differs from the technology name and service name generation device 100 (FIG. 1) in that technology name and service name generation device 200 includes a concept list 210, a point addition unit 220, and a classification identifying unit 260.

Figure 11:
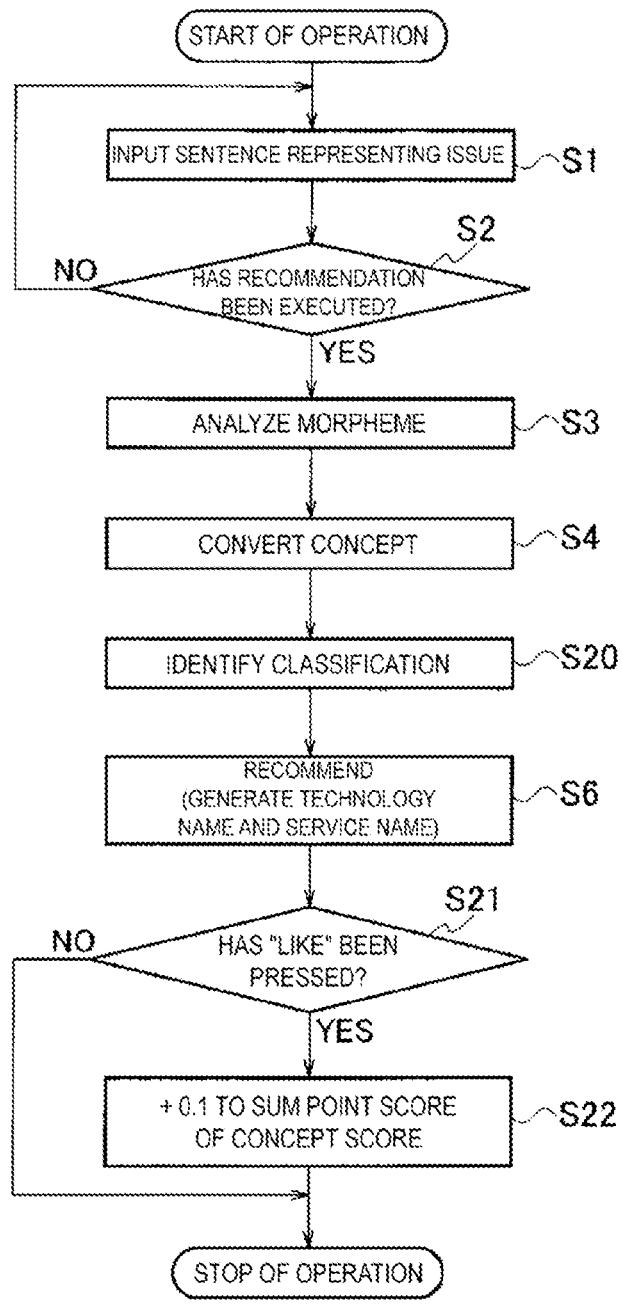
FIG. 11 is a flowchart illustrating a processing procedure of the technology name and service name generation device illustrated in FIG. 10.

FIG. 11 is a flowchart illustrating a processing procedure of the technology name and service name generation device 200. The processing procedure of the technology name and service name generation device 200 differs from that of the technology name and service name generation device 100 in a process after the technology name and the service name are temporarily output (after step S6).

The concept list 210 records a concept group consisting of a plurality of concepts extracted from one sentence input to the sentence input unit 10, a classification of each of technology names and service names, and a sum point score to be increased based on a user operation in association with each other.

The point addition unit 220 increases a sum point score in which the concept group recorded in the concept list 210 based on a user operation and the concept converted by the concept conversion unit 40 match (step S22). The increase in the sum point score is a process that is performed after the technology name and the service name are output once (after step S6). That is, a concept group consisting of a plurality of concepts converted from a newly input sentence is recorded in the concept list 210 each time. Thus, a sum point score at a point in time when the concept group is recorded in the concept list 210 is 0.

The sentence input unit 10 of the technology name and service name generation device 200 according to the present embodiment also displays a "Like" button when displaying the technology name and the service name. The "Like" button is a button that is pressed when the displayed technology name and service name is helpful for the user and the user evaluates the displayed technology name and service name as "Like".

Figure 12:
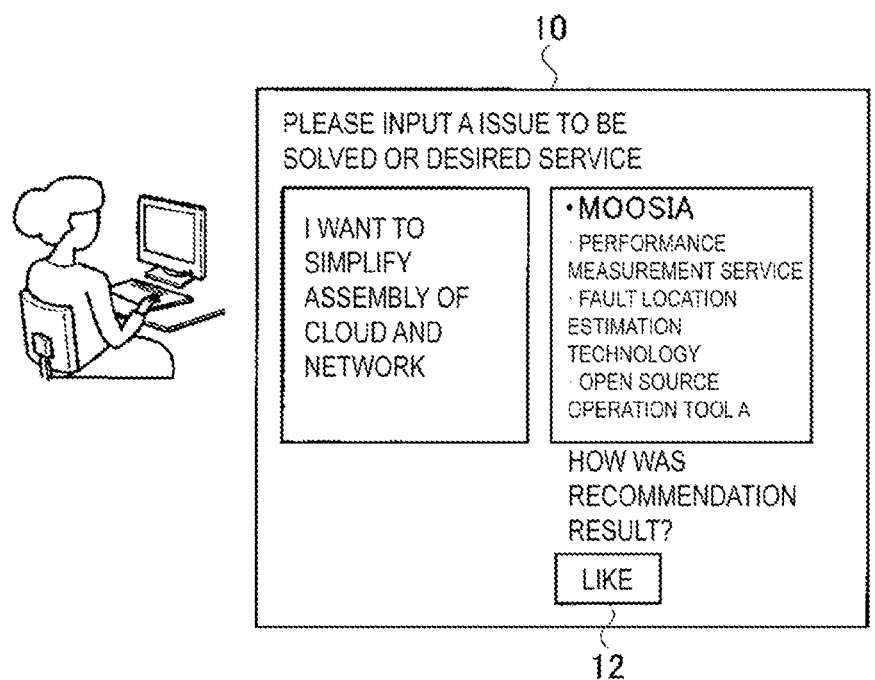
FIG. 12 is a diagram schematically illustrating a state in which a "Like" button is displayed at the same time when technology names and service names are displayed.

FIG. 12 is a diagram schematically illustrating a state in which the "Like" button is displayed at the same time when the technology name and the service name are displayed. The user presses a "Like" button 12 illustrated in FIG. 12 when the user thinks that information on the displayed technology name and service name is helpful (YES in step S21).

When the "Like" button 12 is pressed, the point addition unit 220 increases a sum point score in which the concept group recorded in the concept list 210 and the plurality of concepts extracted and converted from one sentence by the concept conversion unit 40 match (step S22). When the "Like" button 12 is not pressed, the technology name and service name generation device 200 ends the operation.

The classification identifying unit 260 of the technology name and service name generation device 200 after the "Like" button 12 is pressed identifies the classification in consideration of the sum point score recorded in the concept list 210 (step S20).

Figure 13:
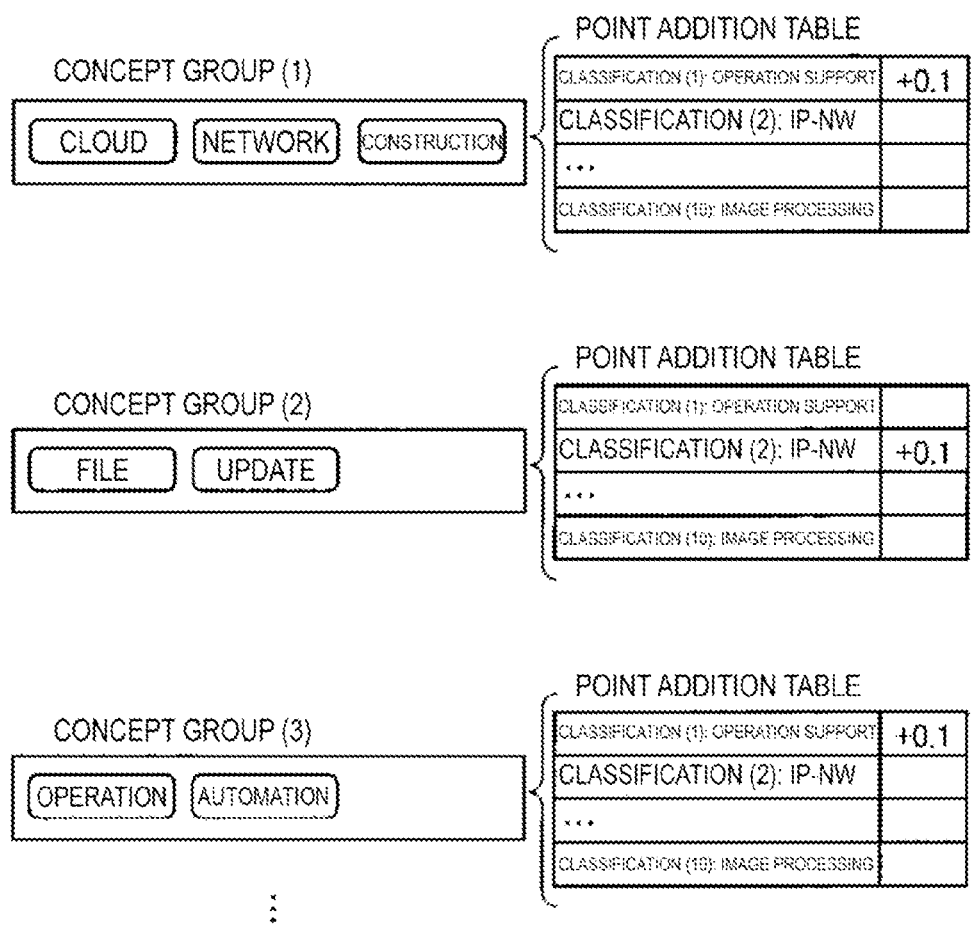
FIG. 13 is a diagram schematically illustrating an example of information recorded in a concept list of the technology name and service name generation device illustrated in FIG. 10.

FIG. 13 is a diagram schematically illustrating an example of information recorded in the concept list 210. The concept list 210 records a concept group consisting of a plurality of concepts extracted from the one sentence, a classification of each of technology names and service names, and a sum point score to be increased based on a user operation in association with each other.

In a concept group (1) illustrated in FIG. 13, a concept group consisting of "cloud", "network", and "construct", a classification, and a sum point score are associated with each other. The sum point score of classification (1) is increased by +0.1 points. The sum point score represents a history of pressing the "Like" button 12.

By identifying the classification in consideration of the sum point score of the concept list 210, it becomes possible to provide a more appropriate technology name and service name that are expected to be evaluated by the user. For example, a case in which a user inputs a resolved issue such as "I want to rapidly assemble a cloud and a network", which is similar to an issue that the user input in the past, is assumed. Because the concept group (1) is extracted from the sentence representing this issue and converted, the classification is identified in consideration of the sum point score.

As described above, the technology name and service name generation device 200 according to the present embodiment includes the concept list 210 recording a concept group consisting of a plurality of concepts extracted from one sentence, a classification of each of technology names and service names, and a sum point score to be increased based on a user operation in association with each other, and the point addition unit 220 that increases the sum point score based on a user operation. The classification identifying unit 260 of the technology name and service name generation device 200 refers to the classification dictionary 50 and the concept list 210 to compare the plurality of concepts extracted from one input sentence and the concept group recorded in the concept list 210. The classification identifying unit 260 of the technology name and service name generation device 200, in a case that the plurality of concepts extracted from the one input sentence and the concept group recorded in the concept list 210 match as a comparison result, sums the score recorded in the classification dictionary 50 and the sum point score recorded in the concept list 210 and identifies a classification having a highest summed score for a score for each classification in which a set of concepts extracted from the sentence and the concept co-occurrence recorded in the classification dictionary 50 match, and in a case that the plurality of concepts extracted from the one input sentence and the concept group recorded in the concept list 210 do not match, sums the scores recorded in the classification dictionary 50 for each classification and identifies a classification having z highest summed score.

Thus, a score of a classification that the user evaluated as "Like" in the past is increased by the sum point score. As a result, it becomes possible to provide a more appropriate technology name and service name that are expected to be evaluated by the user with respect to an issue involving a concept group that has received good evaluation in the past.

Although the example in which a positive sum point score is generated due to pressing of the "Like" button 12 has been illustrated in the present embodiment, a button such as "Hmm, not so good" allowing a user to indicate that the user is not satisfied, instead of or in combination with the "Like" button 12, may be separately displayed on the sentence input unit 10. In this case, when the button such as "Hmm, not so good" is pressed, a sum point score having a negative value is increased (decreased). This is the same as the present embodiment except that the sum point score has a negative value. Thus, detailed description thereof is omitted.

As described above, with the technology name and service name generation device 100 or 200 according to the present embodiment, it is possible to provide a user with information indicating what technology and service are necessary to solve issues.

Because the technology name and service name generation device 100 or 200 is not based on machine learning, a large amount of learning data is unnecessary. Further, the synonym dictionary 30 and the classification dictionary 50 can be easily created.

Because the synonym dictionary 30 collectively associates a plurality of words (synonyms) with one concept, the synonym dictionary 30 is robust against fluctuations in word notation.

In the classification dictionary 50, because scores are associated with a classification of each of technology names and service names, an effort of creating a dictionary is less as compared with associating the scores with the technology names and the service names. That is, it is possible to reduce the number of records in a memory constituting the classification dictionary 50.

Further, even when new technologies and new services appear, it is sufficient to make the new technologies and service subordinate to the classification, and thus, it is easy to add new technologies and new services. The addition of the new technologies and the new services can be realized simply by adding new technology names and new service names under the same classification of the name list 70.

Further, the classification dictionary 50 assigns a score to the concept co-occurrence in which two concepts are combined, and it is easy for the score to be assigned. That is, because the score is assigned to dependence of the two concepts, it is easy to understand this.

Thus, the technology name and service name generation device of the present invention can provide a device and a method for providing a user with information indicating what technology and service are necessary to solve an issue, with a relatively simple configuration.

Although an example in which the present device is configured using one computer or an example in which the present device is configured using a client server system has been described in the above embodiments, the present invention is not limited to this example. For example, although an example in which the morpheme analysis unit 20 is provided inside the technology name and service name generation device 100 or 200 has been described, the morpheme analysis unit 20 may be provided outside. In this case, the technology name and service name generation device and the morpheme analysis engine (the processing device) are connected via a network.

Further, although "network" and "cloud" have no synonyms as an example in the description of the synonym dictionary 30, each concept may have a synonym.

Thus, the present invention is not limited to the above embodiments, and can be modified within the scope of the gist of the present invention.

REFERENCE SIGNS LIST

10 Sentence input unit
11 Recommendation execution button
12 "Like" button
20 Morpheme analysis unit
30 Synonym dictionary
40 Concept conversion unit
50 Classification dictionary
60, 260 Classification identifying unit
70 Name list
80 Recommendation unit
100, 200 Technology name and service name generation device
210 Concept list
220 Point addition unit

The invention claimed is:

1. A technology name and service name generation device for generating a technology name and a service name necessary for solving one or more issues, the technology name and service name generation device comprising:
 a synonym dictionary configured to record words having similar meanings and concepts each representing one or more of the words in association with each other;
 a classification dictionary configured to record concept co-occurrence in which two of the concepts are combined, a classification of each of technology names and service names, and a score assigned to each of the classifications in association with each other;
 a name list configured to record technology names and service names belonging to each of the classifications;
 a sentence input unit to which a sentence representing the issue to be solved is input;
 a morpheme analysis unit, implemented using one or more computing devices, configured to perform morpheme analysis on the sentence and output morphemes;
 a concept conversion unit, implemented using one or more computing devices, configured to extract a word including at least one of a noun or a verb from the morphemes and convert the extracted word to a concept by referring to the synonym dictionary;
 a classification identifying unit, implemented using one or more computing devices, configured to sum scores of respective classifications in which a set of the concepts extracted from the one sentence and the concept co-occurrence match by referring to the classification dictionary, and identify a classification having a highest summed score; and a recommendation unit, implemented using one or more computing devices, configured to obtain, from the name list, the technology names and service names belonging to the classification identified by the classification identifying unit.

2. The technology name and service name generation device according to claim 1, comprising:
a concept list configured to record a concept group including a plurality of the concepts extracted from the input sentence, a classification of each of technology names and service names, and a sum point score to be increased based on a user operation; and
a point addition unit, implemented using one or more computing devices, configured to increase the sum point score,
wherein the classification identifying unit is configured to:
refer to the classification dictionary and the concept list,
in a case that the plurality of the concepts extracted from the input sentence and the concept group recorded in the concept list match, (i) sum the score recorded in the classification dictionary and the sum point score recorded in the concept list and (ii) identify a classification having a highest summed score for a score for each classification in which a set of the concepts extracted from the sentence and the concept co-occurrence match, and
in a case that the plurality of the concepts extracted from the input sentence and the concept group recorded in the concept list do not match, (i) sum the scores recorded in the classification dictionary for each of the classification and (ii) identify identifies a classification having a highest summed score.

3. A technology name and service name generation method executed by a technology name and service name generation device for generating a technology name or a service name necessary to solve one or more issues,
wherein the technology name and service name generation device includes:
a synonym dictionary configured to record words having similar meanings and concepts each representing one or more of the words in association with each other;
a classification dictionary configured to record concept co-occurrence in which two of the concepts are combined, a classification of each of technology names and service names, and a score assigned to each of the classifications in association with each other; and
a name list configured to record technology names and service names belonging to each of the classifications, and
wherein the method includes including:
inputting a sentence representing the issue to be solved;
performing morpheme analysis on the sentence and outputting morphemes;
extracting a word including at least one of a noun or a verb from the morphemes and converting the extracted word to a concept by referring to the synonym dictionary;
summing scores of respective classifications in which a set of the concepts extracted from the one sentence and the concept co-occurrence match by referring to the classification dictionary, and identifying a classification having a highest summed score; and
obtaining, from the name list, the technology names and service names belonging to the identified classification identified in the identifying.

4. The technology name and service name generation method according to claim 3,
wherein the technology name and service name generation device further includes:
a concept list configured to record a concept group including consisting ef a plurality of the concepts extracted from the input sentence, a classification of each of technology names and service names, and a sum point score to be increased based on a user operation; and
a point addition unit configured to increase the sum point score, and
wherein identifying a classification having a highest summed score includes:
referring to the classification dictionary and the concept list;
in a case that the plurality of the concepts extracted from the input sentence and the concept group recorded in the concept list matches, Qsumming the score recorded in the classification dictionary and the sum point score recorded in the concept list and (ii) identifying a classification having a highest summed score for a score for each classification in which a set of the concepts extracted from the sentence and the concept co-occurrence match; and
in a case that the plurality of the concepts extracted from the input sentence and the concept group recorded in the concept list do not match, (i) summing the scores recorded in the classification dictionary for each classification and (ii) identifying a classification having a highest summed score.

* * * * *